United States Patent
Leibu et al.

(10) Patent No.: US 9,232,017 B2
(45) Date of Patent: *Jan. 5, 2016

(54) SYSTEMS AND METHODS FOR MANAGING PROFILES

(71) Applicant: Kobo Inc., Toronto (CA)

(72) Inventors: Daniel Leibu, Toronto (CA); Jason Gambien, Pickering (CA); James Wu, Oakville (CA); Michael Serbinis, Toronto (CA); Pamela Hilborn, Toronto (CA); Richard Penner, Toronto (CA); Tai Toh, Toronto (CA); Dan Galperin, Toronto (CA); Tony O'Donoghue, Toronto (CA)

(73) Assignee: Kobo, Inc., Toronto, Ontario (CA)

( * ) Notice: Subject to any disclaimer, the term of this patent is extended or adjusted under 35 U.S.C. 154(b) by 316 days.

This patent is subject to a terminal disclaimer.

(21) Appl. No.: 13/899,016

(22) Filed: May 21, 2013

(65) Prior Publication Data

US 2013/0254683 A1    Sep. 26, 2013

Related U.S. Application Data

(63) Continuation of application No. 13/304,565, filed on Nov. 25, 2011, now Pat. No. 8,478,757.

(60) Provisional application No. 61/538,101, filed on Sep. 22, 2011.

(51) Int. Cl.
  *G06F 17/30* (2006.01)
  *H04L 29/08* (2006.01)
  *G06Q 30/02* (2012.01)
  *G09B 5/00* (2006.01)
  *G09B 7/00* (2006.01)

(52) U.S. Cl.
  CPC ........ *H04L 67/306* (2013.01); *G06F 17/30997* (2013.01); *G06Q 30/02* (2013.01); *G06Q 30/0269* (2013.01); *G09B 5/00* (2013.01); *G09B 7/00* (2013.01)

(58) Field of Classification Search
  CPC .............................. H04L 67/306; H04L 29/08
  USPC ........................................................ 707/736
  See application file for complete search history.

(56) References Cited

U.S. PATENT DOCUMENTS

| | | | |
|---|---|---|---|
| 8,166,028 B1 * | 4/2012 | Reynar et al. | 707/732 |
| 8,250,065 B1 | 8/2012 | Chambers et al. | |
| 2008/0120670 A1 | 5/2008 | Easton et al. | |
| 2008/0147510 A1 | 6/2008 | Wimberly et al. | |
| 2009/0216569 A1 | 8/2009 | Bonev et al. | |

(Continued)

OTHER PUBLICATIONS

International Search Report and Written Opinion date Feb. 8, 2012, International Patent Application No. PCT/CA2011/001293.
International Search Report and Written Opinion date Mar. 2, 2012, International Patent Application No. PCT/CA2011/001292.

(Continued)

*Primary Examiner* — Jensen Hu
(74) *Attorney, Agent, or Firm* — Bereskin & Parr LLP/S.E.N.C.R.L., s.r.l.

(57) ABSTRACT

Methods and systems for managing profiles for electronic content. The methods and systems may involve profiles for a plurality of electronic content items. If a user interaction with an electronic content item of the plurality of electronic content items meets an event definition, the user interaction may be identified as an event associated with the electronic content and recorded in the profile.

23 Claims, 6 Drawing Sheets

(56) References Cited

U.S. PATENT DOCUMENTS

2010/0211863 A1    8/2010    Jones et al.
2010/0281364 A1    11/2010    Sidman
2011/0106718 A1*    5/2011    Roberts et al. ............... 705/319
2012/0047455 A1*    2/2012    Yuan et al. .................. 715/781

OTHER PUBLICATIONS

Gamification 101: "An Introduction to the Use of Game Dynamics to Influence Behavior", White Paper Bunchball Inc., Oct. 2010, Retrieved online Feb. 23, 2012 from: http://www.bunchball.com/sites/default/files/downloads/gamification101.pdf pp. 4, 6, and 13.

* cited by examiner

ADVENTURES OF HUCKLEBERRY FINN love the smell and sound of his factory at work, and he lived and worked in his personal office above his factories for most of his life. Today, one of R.J.'s old factories still stands, along with the rail line that trailed through it.

Young R.J. was a tall and handsome man — six foot, four inches — and although he spoke with a stammer, he was thoughtful, confident, and intriguing to the town's ladies. In spite of the attention he received from women in Winston, R.J. stayed *intensely focused* on his work — a trend that would keep him from settling down for decades to come.

As an employer, R.J. was known for his fairness, his self-control, and his industrialist attitude. He felt that any man could make a million dollars honestly. R.J. was a hard worker and expected the same of his employ ees; he was always at his office early and worked alongside his employees all day, six

← 500

CHAPTER VIII   2 of 34

ADVENTURES OF HUCKLEBERRY FINN love the smell and sound of his factory at work, and he lived and worked in his personal office above his factories for most of his life. Today, one of R.J.'s old factories still stands, along with the rail line that trailed through it.

Young R.J. was a tall and handsome man — six ← 500

Activity on this Page ✕

[ Add your comments about this page ]  [ Post ]

 4 days ago Johnny liked this page.

 4 days ago Dan added:
Lorem ipsom pylor amet is the best booyk!
Ut enim ad minim veniam, quis nostrud.

👍 23   ❤ 23   😊 24

— 510

 4 days ago James shared a passage on this page to Facebook.

 4 days ago James highlighted a passage on this page to Facebook.

Show more

FIG. 5

SYSTEMS AND METHODS FOR MANAGING PROFILES

CROSS REFERENCE TO RELATED APPLICATIONS

This application is a continuation of U.S. patent application Ser. No. 13/304,565 which claims priority from U.S. Provisional Patent Application No. 61/417,261, filed on Nov. 25, 2010 and U.S. Provisional Patent Application No. 61/538,101 filed on Sep. 22, 2011. The complete disclosure of each of these patent applications is hereby incorporated by reference.

TECHNICAL FIELD

The described embodiments relate to systems and methods for managing profiles, and in particular, to systems and methods for managing profiles of electronic content.

BACKGROUND

Electronic devices may display electronic content as text, images, audio, video or a combination thereof, to a user. One example of an electronic device is an electronic reading device. One example of electronic content is an electronic publication. An electronic publication may also be referred to as an "e-book" or a digital book, and is a digital publication that includes text, images, audio, video or a combination thereof. An electronic publication may be produced by, published by, accessed by, stored by, or readable on electronic reading devices. Electronic publications may be digitized versions of printed materials or may not have a printed equivalent.

Electronic reading devices that are specifically designed for accessing, storing, or displaying electronic publications for a user to read may be referred to as "e-readers", "e-book readers", "e-book devices", and so on. Other computing devices such as personal computers, smart phones, mobile phones, tablet computers, and so on, can also access, store or display electronic publications and other electronic content for a user. Some e-readers use electronic ink, or "e-ink", technology to display an electronic publication to a user in a manner that is preferred by some readers. E-readers may include wired or wireless network connectivity in order to access copies of electronic content, such as electronic books, for display to a user.

SUMMARY

In a first aspect, embodiment described herein may provide a method of managing profiles for electronic content comprising: storing a plurality of profiles for a plurality of electronic content items, wherein each profile corresponds to an electronic content item selected from the plurality of electronic content items; if a user interaction with the electronic content item meets an event definition, identifying the user interaction as an event associated with the electronic content item, wherein the identifying step is carried out using a processor; collecting data corresponding to the event associated with the electronic content item, wherein the data comprises a pagestamp, wherein each pagestamp indicates a reference point within the electronic content item; and recording at least a portion of the data corresponding to the event as a data entry in the profile corresponding to the electronic content item, wherein the data entry comprises the pagestamp.

In accordance with some embodiments, the plurality of electronic content items may be a plurality of electronic publications, and the user interaction with the electronic content item may be a user interaction with a page of an electronic publication of the plurality of electronic publications, and the pagestamp corresponds to the page within the electronic publication.

In accordance with further embodiments, the method may further comprise computing a score for each reference point in the electronic content item using data corresponding to events recorded in the profile of the electronic content item, where the score for each reference point is computed by correlating the event data recorded in the profile of the electronic content item with the pagestamp of each data entry.

In accordance with further embodiments, the method may further comprise computing a score for each page in the electronic publication using data corresponding to events recorded in the profile of the electronic publication, where the score for each page is computed by correlating the event data recorded in the profile of the electronic publication with the pagestamp of each data entry. The score may provide an indication of a level of user interest in the page of the electronic publication.

In accordance with further embodiments, an event associated with the page of the electronic publication may be selected from the group consisting of: turning to the page, turning the page, commenting on the page, indicating a like or dislike of the page, highlighting a portion of the page, annotating a portion of the page, sharing a portion of the page, bookmarking the page, indicating a like or dislike of a comment, replying to a comment, and indicating a like or dislike to a reply to a comment.

In accordance with some embodiments, computing the score for the page may comprise computing a plurality of data points for the page and aggregating the plurality of data points.

In accordance with further embodiments, each data point of the plurality of data points may be associated with a weight factor and computing the score may comprise weighting each data point using the corresponding weight factor and aggregating the weighted data points.

In accordance with some embodiments, the data points may be selected from the group consisting of: number of purchases of the electronic publication, a number of completions of the electronic publication, a number of times users read the electronic publication or the page, average time to read the electronic publication or the page, share rate, annotation rate, highlight rate, comment rate, comment rate compared to annotation rate, bookmark rate, like or dislike ratio; like or dislike to comment ratio, random noise range, number of users of the electronic publication and page thereof.

In accordance with some embodiments, the method may further comprise computing a score for the electronic content using the data entries recorded in the profile of the electronic content.

In another aspect, embodiments described herein may provide a method of displaying electronic content to a user the method comprising: collecting data about a plurality of user interactions with at a reference point within the electronic content; calculating a score associated with the reference point within electronic content using the data, wherein the calculating step is carried out using a processor; and displaying a visual indicator representing the score associated with the reference point within the electronic content when the electronic content is displayed to a user.

In accordance with some embodiments, the electronic content may be an electronic publication, and the user interaction may be associated with a page of the electronic publication, and the method may further involve calculating a score for the page of the electronic publication and displaying a visual indicator representing the score for the page of the electronic publication. The score may provide an indication of a level of user interest in the page of the electronic publication.

In accordance with further embodiments, the user interaction may be selected from the group consisting of: purchasing a book, completing a book, reading a book, turning to the page, turning the page, sharing the page, commenting on the page, indicating a like or dislike of the page, highlighting a portion of the page, annotating a portion of the page, and bookmarking the page.

In accordance with some embodiments, the calculating step may be based on data selected from the group consisting of: number of purchases of the electronic publication, number of completions of the electronic publication, number of times the electronic publication is read, number of times the electronic publication or the page is read, average time to complete the electronic publication or the page, average time spent reading the electronic publication or the page when not complete yet, share rate; annotation rate, highlight rate, comment rate, comment rate compared to annotation rate, bookmark rate, like or dislike ratio, like or dislike to comment ratio, random noise range, and number of users reading the electronic publication or the page.

In accordance with further embodiments, the method may further comprise: displaying on the page a link to an interface for collecting data defining whether the users like or dislike the page; using the interface, collecting data defining whether the users like or dislike the page; computing a like or dislike reading score for the page based on the data defining whether the users like or dislike the page; and displaying a visual representation of the like or dislike reading score.

In accordance with some embodiments, the method may further comprise: displaying on the page a link to an interface for collecting comments about the page from the users; using the interface, collecting comment data about the page from the users; computing a comment score for the page based on the comment data; and displaying a visual representation of the comment score and at least a portion of the collected comments.

In accordance with further embodiments, the method may further comprise: collecting statistical data about the user interaction with the electronic content item; calculating a score associated with the electronic content item using the statistical data, wherein the score represents a level of user interest in the electronic content item; displaying a visual representation of the score associated with the electronic content item.

In accordance with some embodiments, the method may further comprise computing a score for each reference point within the electronic content item using the collected data.

In accordance with some embodiments, the method may further comprise displaying a visual indicator representing the calculated score for each reference point within the electronic content item.

In a further aspect, embodiments described herein may provide a method of managing a network of users and electronic publications comprising: storing a plurality of profiles for a plurality of users, wherein each user profile is associated with a user of at least one device configured to access at least one electronic publication in a memory, wherein each user profile comprises a user identifier identifying the user; storing a plurality of profiles for a plurality of electronic publications, wherein each electronic publication comprises a plurality of pages; if a user interaction with a page of one of the plurality of electronic publications meets an event definition, identifying the user interaction as an event associated with the page of the electronic publication, wherein the identifying step is carried out using a processor; collecting data corresponding to the event associated with the page of the electronic publication, wherein the data comprises a pagestamp and the user identifier, wherein the pagestamp indicates the page in the electronic publication, and wherein the user identifier indicates the user associated with the user interaction; and recording at least a portion of the data corresponding to the event as a data entry in the profile of the electronic publication, wherein the data entry comprises the pagestamp and the user identifier.

In accordance with further embodiments, the method may further comprise storing a plurality of event definitions. The method may involve identifying the user interaction as an event comprises matching input data to at least one of the plurality of event definitions.

In accordance with some embodiments, the method may further comprise providing a notification of an occurrence of the event to a social network application.

In accordance with further embodiments, receiving data associated with the event further comprises receiving a time period associated with reading the electronic publication.

In accordance with some embodiments, receiving data associated with the event further comprises receiving content from the at least one electronic publication.

In accordance with some embodiments, receiving data associated with the event further comprises receiving a location of the at least one device configured to access the at least one electronic publication.

In accordance with further embodiments, the event is associated with at least one of the group consisting of: commenting on the page, annotating the page, indicating a like or dislike about the page, turning a number of pages in the electronic publication, adding the electronic publication to an electronic library, finishing the electronic publications, reading the electronic publication in a location, and reading about a character on the page.

In another aspect, embodiments described herein may provide a system for managing profiles for electronic content, the system comprising: a profile module configured to: store a plurality of profiles for a plurality of electronic content items in a memory, wherein each profile comprises an electronic content identifier associated with the corresponding electronic content item; an event detection module configured to identify, using a processor, a user interaction with a reference point within the electronic content item as an event if the user interaction meets at least one event definition, and to receive data associated with the event, wherein the data includes a pagestamp indicating the reference point within the electronic content; and wherein the profile module is further configured to record at least a portion of the data associated with the event in the profile of the electronic content item.

In accordance with some embodiments, the electronic content item may be an electronic publication, the user interaction may be with a page of the electronic publication, and the pagestamp may indicate the page within the electronic publication.

In accordance with further embodiments, the system may further comprise: an event definition module configured to define a plurality of event definitions; and a rules engine configured to store and manage the plurality of event definitions.

In accordance with some embodiments, the event detection module may be configured to identify an event by interacting with the rules engine to match input data to the at least one event definition.

In accordance with some embodiments, the system may further comprise an analytics engine configured to process data associated with events to compute the scores for each page in the electronic publication by correlating the data associated with the events based on the pagestamp.

In a further aspect, embodiments described herein may provide a method of managing profiles for electronic publications comprising: storing a plurality of profiles for a plurality of electronic publications, wherein each profile corresponds to an electronic publication selected from the plurality of electronic publications; detecting on a device a user interaction with a page of an electronic publication of the plurality of electronic publications; if the user interaction with the page of the electronic publication meets an event definition, identifying the user interaction as an event associated with the page of the electronic publication, wherein the identifying step is carried out using a processor; collecting data corresponding to the event, wherein the data comprises a pagestamp, wherein each pagestamp indicates the page within the electronic publication; recording at least a portion of the data corresponding to the event as a data entry in the profile corresponding to the electronic publication, wherein the data entry comprises the pagestamp; computing a score for each page in the electronic publication using data corresponding to events recorded in the profile of the electronic publication, wherein the score for each reference point is computed by correlating the event data recorded in the profile of the electronic content item with the pagestamp of each data entry, wherein the score provides an indication of a level of user interest in the page of the electronic publication, and displaying a visual indicator representing the score for each page of the electronic publication when the page of the electronic publication is displayed on the device.

In another aspect, embodiments described herein may provide a system of managing profiles for electronic publications comprising: a profile module configured to store a plurality of profiles for a plurality of electronic publications, wherein each profile corresponds to an electronic publication selected from the plurality of electronic publications; an event detection module configured to: detect on a device a user interaction with a page of an electronic publication of the plurality of electronic publications; if the user interaction with the page of the electronic publication meets an event definition, use a processor to identify the user interaction as an event associated with the page of the electronic publication; collect data corresponding to the event, wherein the data comprises a pagestamp, wherein each pagestamp indicates the page within the electronic publication; and an event analytics engine configured to use the processor to compute a score for each page in the electronic publication using data corresponding to events recorded in the profile of the electronic publication, wherein the score for each reference point is computed by correlating the event data recorded in the profile of the electronic content item with the pagestamp of each data entry, wherein the score provides an indication of a level of user interest in the page of the electronic publication; wherein the profile module is further configured to: record at least a portion of the data corresponding to the event as a data entry in the profile corresponding to the electronic publication, wherein the data entry comprises the pagestamp; and display a visual indicator representing the score for each page of the electronic publication when the page of the electronic publication is displayed on the device.

BRIEF DESCRIPTION OF THE DRAWINGS

For a better understanding of embodiments of the systems and methods described herein, and to show more clearly how they may be carried into effect, reference will be made, by way of example, to the accompanying drawings in which:

FIG. 4 is a screen display of rendered data to provide a visual display of data from a profile of electronic publications in accordance with at least one embodiment;

FIG. 5 is another screen display of rendered data to provide a visual display of data from a profile of electronic publications in accordance with at least one embodiment.

Figure 1:
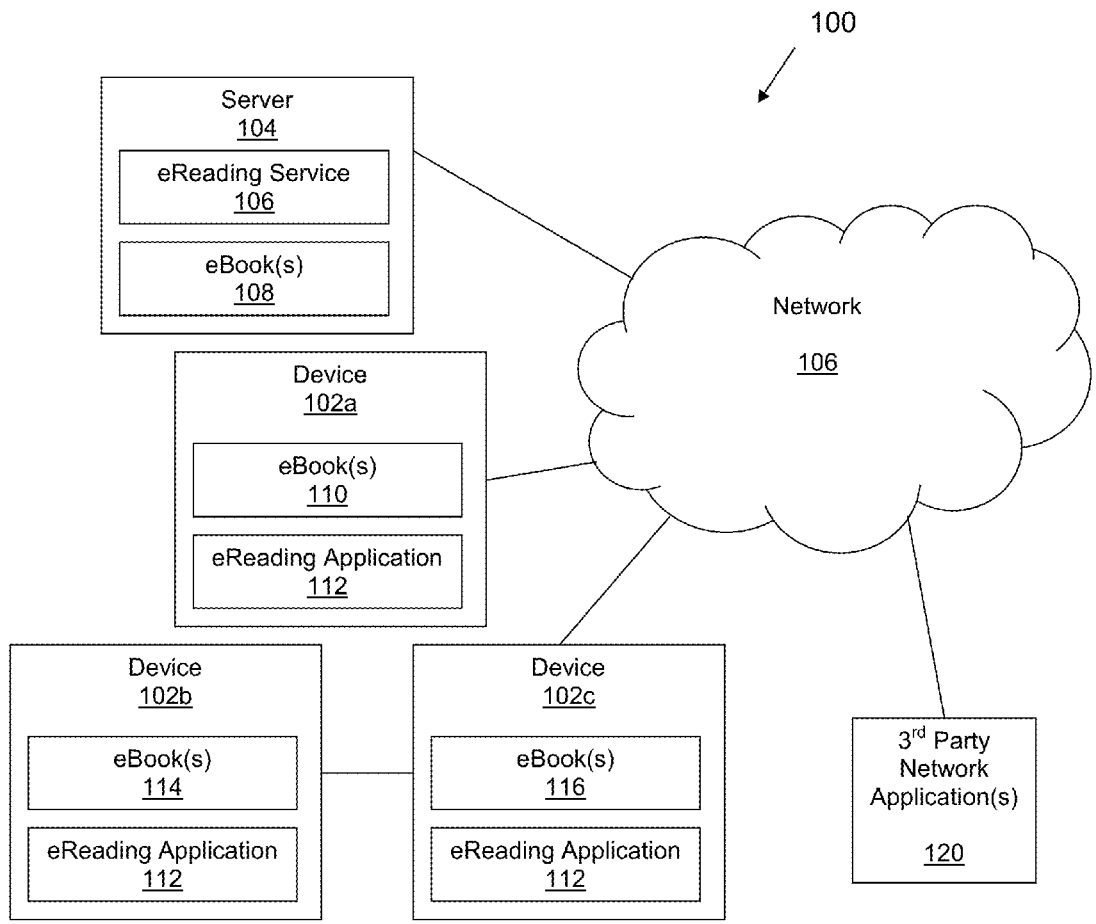
FIG. 1 is a block diagram of components interacting with a system for managing profiles of electronic publications in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, personal data assistant, or mobile device. Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

As an illustrative example, the systems and methods described herein may manage profiles of electronic publications. However, those skilled in the art will understand that the described embodiments may also be used to manage profiles of other types of electronic content, such as movies, television shows, music albums or songs. An instance of electronic content may be referred to herein as an electronic content item. When a user interacts with an electronic content item the interaction may be associated with a reference point within the user interaction. For example, if the electronic content item is an electronic publication the reference point may be a page within the electronic publication. As another example, if the electronic content item is a movie the reference point may be a frame within the movie. As a further example, if the electronic content item is a song the reference point may be a point of time within the song. As another example, if the electronic content item is a television show then the reference point may be a point of time within the television show. These are examples and there may be other reference points and types of electronic content.

Reference is now made to FIG. 1, which illustrates a block diagram of components interacting with a system 100 for managing profiles of electronic content in accordance with an example embodiment. System 100 maintains a record of metrics, data points, scores, and events by collecting and processing input data received from a server 104, at least one device 102a, 102b, 102c, electronic content (such as for example, one or more electronic publications or "e-books" 108, 110, 114, 116), computer applications, such as social networking applications 120, or a combination thereof. Input data received from the user's interactions with one or more electronic publications may be referred to as user interactions or activities, and may be recorded by system 100 in profiles associated with electronic publications as data entries. Certain user interactions may be identified by system 100 as metrics or events, and the identification of metrics and events is described in detail below. The system 100 identifies certain user interactions as metrics or events and compiles received data associated with the metrics or events. The system 100 analyzes the data associated with metrics, events, or a combination thereof, to compute a score for each page in an electronic publication and for the electronic publication as a whole, and to compute other statistical data. Data from metrics, events, statistical analysis, and scores may be collected, analyzed, and stored by system 100 to form part of a detailed profile for an electronic publication. An electronic publication may be read by multiple users on multiple devices 102a, 102b, 102c and system 100 may collate collected metrics and data associated with events across all users and devices for the electronic publication profile. The scores may provide an indication of a level of user interest in a page of the electronic publication or in the whole electronic publication. System 100 is operable to use the scores to rank or recommend electronic publications. System 100 is operable to create social network or graph of electronic publications by linking profiles of electronic publications through user interactions with the electronic publications.

As used herein, the terms metrics, events and notifications are defined as follows:

"Metrics" are defined as user interactions that are recorded by system 100. User interactions may be any interaction a user has with server 104, device 102a, 102b, 102c, electronic publications 108, 110, 114, 116, social network applications 120, or a combination thereof. Metrics may be either direct user interactions with an electronic publication, such as for example a page turn, or indirect user interactions, such as for example reading at a specific time. Metrics include user interactions with the electronic publication, such as turning a page, and may also include data elements, such as the location of the user or device 102a, 102b, 102c, electronic publication title, timestamp, pagestamp, type of electronic publication, genre of electronic publication, author of the electronic publication, reading rate, and so on. Metrics may be viewed as a subset of user interactions, as not all user interactions may be recorded as metrics by system 100.

"Events" are a predefined subset of metrics. Specifically, events may be those user interactions with an electronic publication that are recorded as part of the profile for the electronic publication and used by system 100 to generate a score for the electronic publication and pages thereof. The score may provide an indication of a level of user interest in a page of the electronic publication or the electronic publication as a whole. For example, an event may be a user comment on a page of an electronic publication. Additionally, events may contain resource data of images, audio, video, pagestamp, timestamp, and text which are used in the creation of notifications and visual representations of the score and other data entries of the profile of the electronic publication. An event may include a predicate or condition which operates on the set (or a subset) of metrics and events recorded by the system 100 to determine whether the event has been achieved by the user. A pagestamp may refer to a reference point within the electronic content such as a page within an electronic publication, a frame within a movie, a point of time within a song, a point of time within a television show, and so on.

"Notifications" are communications provided to the user via a user interface to inform the user that a particular event has occurred. Notifications may include the resource data (such as for example images and text) associated with the corresponding event to inform the user that the particular event or achievement that has taken place. Notifications may also include a communication of the score associated with an electronic publication, user comments about the electronic publication, and so on. Notifications may include an advertisement or offer sponsored by an advertiser. As will be explained herein, system 100 can process data associated with metrics and events to identify an advertisement or offer based on the profile of the electronic publication. System 100 may determine a suitable advertisement by analyzing the content of electronic publication captured as metrics and events by system 100. Notifications may also be provided to users as a visual representation of captured metrics and events. For example, a visual representation of the score or all comments made by users on a particular page of an electronic publication may be provided to users when that particular page is displayed.

As an illustrative example, system 100 may record data associated with user interactions with a particular electronic publication made by multiple users. System 100 is operable to display pages of the electronic publication via a user interface along with various mechanisms for collecting data regarding user interactions. For example, system 100 is operable to provide a mechanism (e.g. a link to an interface) for a user to like or dislike a page of an electronic publication, a mechanism (e.g. a link to an interface) for user to comment on the page of electronic publication, a mechanism (e.g. a link to an interface) for user to share the page or portion thereof with other users, and a mechanism for a user to highlight a portion of the page. System 100 is operable to record these specific types of user interactions as event definitions. When the system 100 detects one of these types of user interactions with the particular electronic publication then the system 100 is operable to identify that particular user interaction as an event, receive data corresponding to the event, including a pagestamp indicating the page of the electronic publication, timestamp, and so on. A pagestamp may refer to a reference point within the electronic content such as a page within an electronic publication, a frame within a movie, a point of time within a song, a point of time within a television show, and so on. System 100 records data corresponding to the event in the profile of the electronic publication. System 100 is operable to record user interactions with a particular electronic publication made by multiple users in the profile of the electronic publication. System 100 is operable to use the data recorded in the electronic publication in order to compute a score for each page of the electronic publication and for the electronic publication of the whole. The score may provide an indication of a level of user interest in a page of the electronic publication or the electronic publication as a whole. The score may be used to rank or recommend electronic publications or pages thereof. When a page of the particular electronic publication is displayed to a subsequent user, the system 100 is operable to provide a notification to the user about the score of the page and data recorded as part of the profile of the electronic publication, such as the number of comments on the page made by users and a comment feed displaying the content of the comments. System 100 may enable users to connect through an electronic publication, such as, for example, when multiple users are reading the same electronic publication. Users can interact with the electronic publication, which interactions may be visible by the other users. Users can communicate with each other about the electronic publication through, for example, comments and replies to comments about the electronic publication or a page thereof. A user may also interact with other user interactions, both of which will be referred to as user interactions. For example, a user can like or dislike another user's comment on a page of an electronic publication.

Referring back to FIG. 1, system 100 may include a server 104 which includes a memory store, such as database(s) or file system(s). Although only one server 104 is shown for clarity, there may be multiple servers 104 or groups of servers 104 distributed over a wide geographic area and connected via network 106, for example. Server 104 has a network interface for connecting to network 106 in order to communicate with other components, to serve web pages, and execute other computing applications.

Continuing to refer to FIG. 1, server 104 may connect to one or more devices 102*a*, 102*b*, 102*c* via network 106. Although only three devices 102*a*, 102*b*, 102*c* have been illustrated, any suitable number of devices may connect to the server 104. Server 104 may provide an eReading service 106 to devices 102*a*, 102*b*, 102*c*, such as providing access to a catalogue of electronic publications, for example. The eReading services 106 may also include providing a social network application connecting profiles of users and electronic publications through user interactions captured and recorded in profiles. The social network application may be an online service, platform, or site that builds electronic social networks and social relationship links between profiles of electronic publications and users, which may be viewed as nodes in the social network. A social network application may represent each electronic publication and user as an electronic profile, and construct a social network for users by creating electronic links to electronic publication profiles, other user profiles and pages. The server 104 may include a web server to receive and respond to requests received from devices 102*a*, 102*b*, 102*c*.

Device 102*a*, 102*b*, 102*c* may be any networked computing device including a processor and memory, such as an electronic reading device, a personal computer, workstation, server, portable computer, mobile device, personal digital assistant, laptop, smart phone, WAP phone, an interactive television, video display terminals, gaming consoles, and portable electronic devices or a combination of these. Device 102*a*, 102*b*, 102*c* may include a microprocessor that may be any type of processor, such as, for example, any type of general-purpose microprocessor or microcontroller, a digital signal processing (DSP) processor, an application-specific integrated circuit (ASIC), a programmable read-only memory (PROM), or any combination thereof. Device 102*a*, 102*b*, 102*c* may include any type of computer memory that is located either internally or externally to the device 102*a*, 102*b*, 102*c* such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Device 102*a*, 102*b*, 102*c* may include one or more input devices, such as a keyboard, mouse, camera, touch screen and a microphone, and may also includes one or more output devices such as a display screen and a speaker. Device 102*a*, 102*b*, 102*c* has a network interface for connecting to network 106 in order to communicate with other components. The illustrated device 102*a*, 102*b*, 102*c* may be different types of devices.

In accordance with some embodiments, device 102*a* may be an electronic reading device designed specifically for reading electronic publications, such as a Kobo™ eReader. Device 102*a* need not be specifically designed for reading electronic books and may be a general purpose computer, a laptop computer, a tablet computer, a personal digital assistant (PDA), a mobile device, a smart phone, an interactive television, video display terminals, gaming consoles, and portable electronic devices, and so on. Device 102*a* may store electronic publications 110 locally or may access electronic publications 108 residing on server 104 for display to user. In accordance with alternative embodiments, device 102*a* may be any computing device with a processor and memory configured for other types of electronic content, such as movies, television shows, music albums or songs.

In accordance with some embodiments, device 102*b* may be an electronic reading device that directly connects, via a serial bus for example, to another device 102*c*, such as a personal computer in order to connect to network 106 and server 104. Devices 102*b*, 102*c* may be a general purpose computer, a laptop computer, a tablet computer, a personal digital assistant (PDA), a mobile device, a smart phone, an interactive television, video display terminals, gaming consoles, and portable electronic devices, or a combination thereof. Device 102*b* may store electronic publications 114 locally, or may access electronic publications 116 residing on another device 102*c*, or may access electronic publications 108 residing on server 104 for display to user.

As used herein, electronic publications 108, 110, 114, 116 may include any text, audio, image, video, or combination thereof, in electronic form that is capable of being displayed to a user on device 102*a*, 102*b*, 102*c*, including without limitation electronic books, newspapers, magazines, and other publications.

According to exemplary embodiments, the devices 102*a*, 102*b*, 102*c* capable of storing and executing an electronic reading ("eReading") application 112. The eReading application 112 may communicate with eReading Service 106 residing on the server 104 to allow a user operating a device 102*a*, 102*b*, 102*c* to access reading services hosted by the server 104.

Network 106 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

System 100 may also include third-party network applications 120 which may be an online service, platform, or site that builds electronic social networks and social relationship links between people (including users of the system 100), which may be viewed as nodes in the network. Third-party network applications 120 may represent each user as an electronic profile, and construct a social network for the user by creating electronic links to other user profiles and pages. Examples of third-party network applications 120 include Facebook™, LinkedIn™, MySpace™, FourSquare™ and Twitter™.

Figure 2:
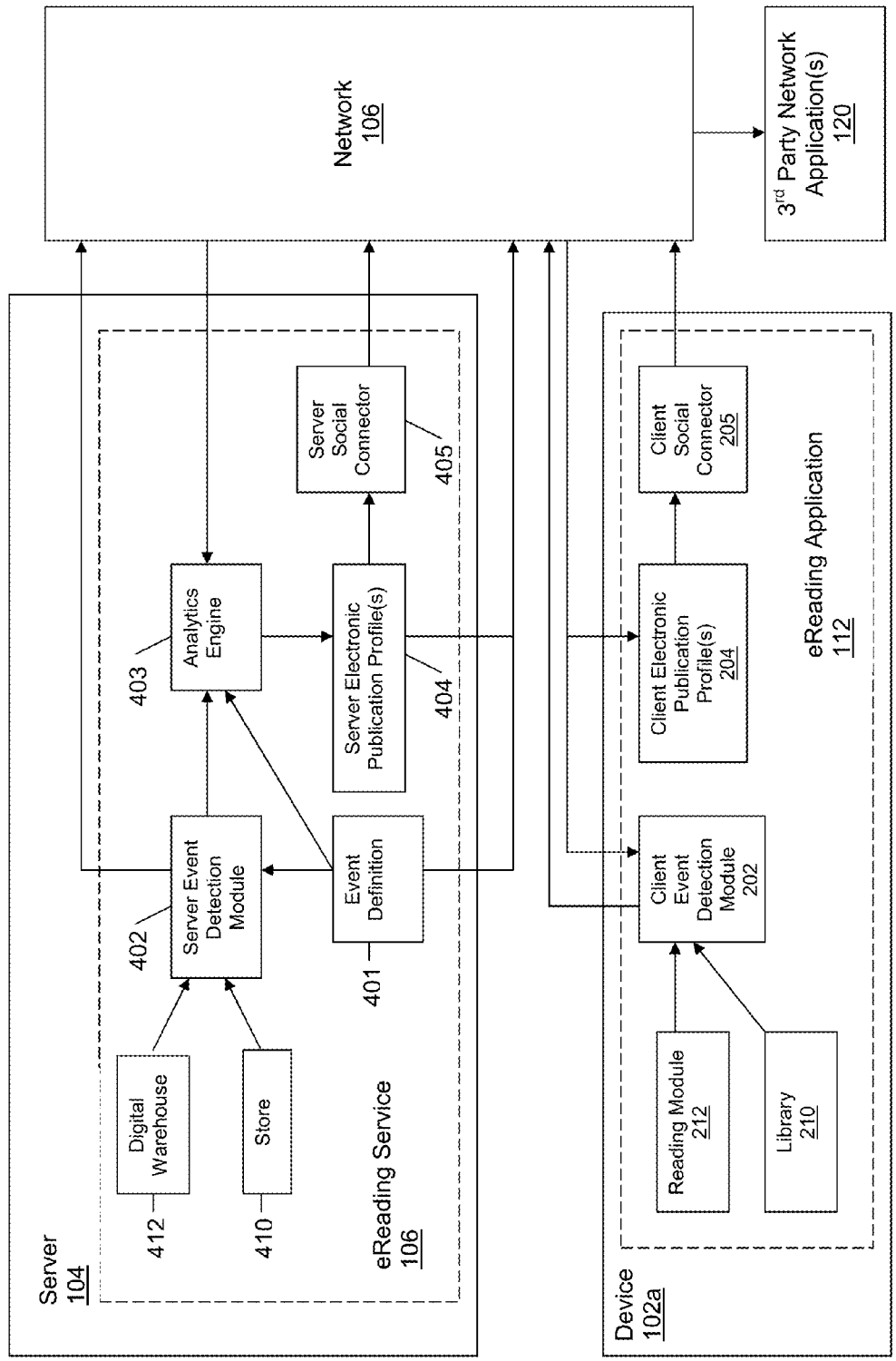
FIG. 2 is a block diagram of the system for managing profiles of electronic publications in accordance with at least one embodiment.

Reference is now made to FIG. 2, in which an exemplary embodiment of the system 100 of FIG. 1 is illustrated. In the exemplary embodiment shown in FIG. 2, only device 102*a* is illustrated together with the server 104, and the network 106. For clarity, e-books 110 and 108 are omitted from the illustration of device 102*a* and server 104, respectively, in FIG. 2.

Server 104 and device 102*a* are configured to access and record metrics, identify events and compute scores for pages of an electronic publications 108, 110, 114, 116 and the whole electronic publication, based on user interactions with the electronic publication 108, 110, 114, 116 (shown in FIG. 1) accessible to server 104, device 102*a*, or both. Server 104 records data associated with metrics and events in a profile of an electronic publication (illustrated in FIGS. 4, 5, 6) and analyzes the data associated with metrics and events to compute scores for pages of the electronic publication as well as a score for the electronic publication as a whole. For example, device 102*a* may include a global positioning system and provide its geographic location (and in turn the geographic location of the user) to server 104. A user reading the electronic publication on the device may indicate that they like a particular page in electronic publication and provide a comment on the page using the provided mechanisms. System is operable to record the geographic location, the like indication and the comment in the profile of electronic publication along with the pagestamp indicating the page.

In this exemplary embodiment, device 102*a* is configured with eReading application 112 that includes reading module 212, library 210, client event detection module 202, client electronic publication profile 204 (which is an example of an electronic publication profile), and client social connector 205. The reading module 212 allows a user to access electronic publications 108, 110, 114, 116 (FIG. 1) that are stored on the device 102*a* in a library 210, or on server 104 in a digital warehouse 412. The reading module 212 is able to provide a user with options for viewing, managing, manipulating and reading electronic publications 108, 110, 114, 116. The reading module 212 is further operable to display the score computed for each page in the electronic publication based on the data in the profile for the electronic publication. The reading module 212 is further operable to provide mechanisms for indicating a like/dislike of a page (or for the entire electronic publication), for providing a comment, for highlighting a portion of the page, for sharing the page, or annotating a portion of the page, and otherwise marking-up pages of the electronic publication, and so on. Others options may include for example searching the contents of the library 210 or digital warehouse 412 for a desired electronic publications, listing available electronic publications, selecting an electronic publication, reading an electronic publication by sequentially viewing pages of the electronic publications, and viewing other users' comments, highlights, annotations and so on.

Client event detection module 202 is operable to monitor user interaction received as input data when a user interacts with an electronic publication using the reading module 212, library 210, the device 102*a*, social network application, or a third-party network application 120, such as Facebook™ or Twitter™. Client event detection module 202 may record predefined user interactions with the electronic publication in the profile of the electronic publication as metrics. Further, client event detection module 202 is operable to monitor user interactions with the electronic publication to identify events. In an exemplary embodiment user interactions performed on the device 102*a* may include, for example, turning a page, completing a chapter, completing an electronic publication, completing a series/collection of electronic publications and completing a predetermined number of pages, chapters, and electronic publications. In addition, user interactions may include indicating a like/dislike of a page of electronic publication, making a comment on a page, annotating a portion of the page, and so on. Client event detection module 202 may record these example user activities in the electronic publication profile as metrics. Client event detection module 202 is operable to determine whether any recorded metrics may be identified as events, and recorded in the electronic publication profile as events. Client event detection module 202 is configured to interact with server event detection module 402, which is another instance of this module that resides on the server 104. Client event detection module 202 is further configured to interact with event definition module 401 in order to identify events if a user's interaction meets an event definition stored and managed thereby.

As an example, a user may be reading the electronic publication "Alice in Wonderland" and client event detection module 202 may identify and store the electronic publication title and an associated reading time as a metric. When the user turns to a page in the electronic publication which describes Alice meeting the Cheshire cat for the first time in the e-book, then client event detection module 202 may record this virtual meeting as a metric and may identify this virtual meeting. The user may then indicate that they "like" the page and comment on the page. This data will be recorded in the profile of the electronic publication along with the pagestamp indicating the page. As another example, when the user turns a page in the electronic publication that describes Alice arriving at a place, such as the rabbit hole, for the first time, then client event detection module 202 may record this virtual arrival at a place as a metric and may identify this virtual arrival as an event. The user may indicate that they "dislike" this page and system will record this data as part of the profile for the electronic publication along with the pagestamp.

In the exemplary embodiment illustrated in FIG. 2, server 104 is configured with an eReading service 106 that includes a digital warehouse 412 for cataloguing, storing and making available copies of electronic publications (not shown), a digital store 410 for processing electronic publication purchases, a server event detection module 402, event definition module 401, server reading profiles 404, and a server social connector 406.

Event definition module 401 generates and stores event and definitions for use by server event detection module 402 and client event detection module 202 to identify events when monitoring user interactions. Event definition module 401 may further include metric definitions to determine when a specific user interaction should be recorded by the system 100 as a metric. An example of a metric is a user turning a page in an electronic publication. An example of an event includes a user commenting on a page in an electronic publication. Event definition module 401 generates and stores definitions for contextual information for user interactions that also may be identified and captured by system 100 as metrics, or events, such as for example a user turning a pre-defined number of pages in a specific electronic publication, such as Pride and Prejudice by Jane Austen. Metrics and events may be based on one or more of the following dimensions: activity based (e.g. adding a new e-book to the user's library 210); time based (e.g. reading between midnight and 3 am); content based (e.g. finished the last book of the Twilight series); and location based (e.g. reading on a beach in Mexico). Event definition module 401 may further be operable to generate and store definitions associated with advertisements. Server 104 process metrics and data associated with events using these definitions associated with advertisements to determine when a particular advertisement should be displayed to a user and how the particular advertisement should be displayed to a user.

Server event detection module 402 is similar to client event detection module 202 except that it resides on server 104 and monitors user interactions with an electronic publication associated with the server 104, such as for example searching for and purchasing a specific electronic publication. Server event detection module 402 monitors user interactions with electronic publications to identify metrics or events if a user interaction meets a metric or an event definition, as defined in and managed by event definition module 401. Server event detection module 402 may also be configured to identify metrics or events occurring at device 102*a* by interacting with the client event detection module 202 residing on device 102*a*. Server event detection module 402 may detect events based on user interactions with a digital warehouse 412 and store 410 resident on the server 104. Server event detection module 402 also detects events through user interactions on the social network application and third-party network applications 120. Server event detection module 402 may detect user interactions and metrics associated with the same electronic publication made by multiple users across multiple devices 102*a*, 102*b*, 102*c* and is operable to receive data associated with multiple users and with multiple devices 102*a*, 102*b*, 102*c*, and record such user interactions as metrics in the profile of the electronic publication and identify events associated with such user interactions even though they occur by multiple users and on multiple devices 102*a*, 102*b*, 102*c*. Server event detection module 402 will collate these metrics to compute scores for pages of the electronic publication and for electronic publication as a whole.

When server event detection module 402 records a metric or identifies an event, event detection module 402 provides data associated with the metric or the event (e.g. time, date, title of e-book, activity description, contents, pagestamp, and so on) to analytics engine 403. Analytics engine 403 includes a rules engine with event definitions configured as rules in order to analyze patterns of metrics and events, compute scores for pages of electronic publication and for the whole electronic publication, compute statistical data for the profile, and construct a profile for the electronic publication. Analytics engine 403 performs pattern matching of input data to metric and events definitions, and definitions associated with advertisements stored in the event definition module 401. As noted herein, system 100 may store predetermined definitions which describe rules for when certain activities qualify as a metric, an event, an advertisement to be provided, or a combination thereof. The analytics engine 403 then uses the definitions in the event definition module 401 to compute statistical data about a metric, an event, a group of metrics or a group of events, compute scores for pages of the electronic publication, other statistical data for the profile, or determine if an advertisement should be provided to a user. The output of the analytics engine 403 may then be communicated to server electronic publication profile 404 on the server 104, a client electronic publication profile 204 on the device 102*a*, or both. As will be described in detailed herein, analytics engine 403 is operable to compute scores for pages of electronic publications and for the publication as a whole using data in the profile of the electronic publication. The analytics engine 403 may weight data used to compute the score and may also normalize the weighted data prior to aggregating the data in order to compute the score. In some embodiments, server 104 may include a separate advertisement analytics engine (not shown) configured with rules for advertisements definitions. Advertisement analytics engine, instead of or in addition to analytics engine 403, may determine whether an advertisement, recommendation or offer should be provided to a user based on recorded metrics, events, user interactions, scores and so on.

Illustrative examples of profiles are electronic publication profiles 204, 404 which are configured to store and to render data from the profile of electronic publications to provide a visual representation for display on at least one device 102*a*, 102*b*, 102*c*. The server electronic publication profile 404 may include multiple profiles for multiple electronic publications and the client electronic publication profile 204 may include copies of the profile of electronic publications residing on the device 102*a*. Server electronic publication profile 404 and client electronic publication profile 204 contain an electronic publication identifier, a log of identified metrics and events associated with the electronic publication, notifications, computed score, computed statistical data, and other information associated with the electronic publication. The content of the electronic publication profile 204 maintained on device 102*a* and the electronic publication profile maintained in electronic publication profiles 404 stored on the server 104 may be synchronized periodically or in real time.

In certain embodiments, a server social connector module 405 is resident on the server 104 and a client social connector module 205 is resident on the device 102a. Social connectors 205, 405 are configured to share, publish, and broadcast contents of electronic publication profile 404, 204 to social network application and third-party network applications 120, and receive user activity data from social network applications 120 in order to detect metrics and events. For example, social connectors 205, 405 are configured to share, publish, broadcast metrics, events, scores, offers, and advertisements to social network applications 120. In certain embodiments, elements from the electronic publication profile 404, 204 are communicated via the network 106 to third-party network applications 120, including for example social networking sites such as Facebook™, LinkedIn™, Foursquare™ and Twitter™.

Event detection modules 202, 402, and event definition module 401 may be configured to define and detect content-based metrics, events and advertisements that the user can interact with. For example, event definition module 401 may compute data by searching content from electronic publications regarding characters and locations in the electronic publication. The user may interact with these generated content based metrics, events and advertisements. In response to such interaction, event detection modules 202, 402 may identify an event. For example, the first time a particular character is described or referred to in a page in the electronic publication, event detection modules 202, 402 may display an indication that a user is meeting this character from the electronic publication for the first time and identify this virtual meeting as an event. The algorithm used to obtain data for the content-based events may include: manual selection, keyword searching, crowd sourcing, and import of third party datasets. For example, when a new character is introduced on a page of an electronic publication, event detection module 202, 402, may detect the occurrence of an event in response to receiving a request to create an event from the user. For example, the request may be initiated by highlighting and clicking on the name of the character. System 100 may record the occurrence of a new event. In some alternative embodiments, system 100 may propagate this detection to all other event detection modules 202, 402, corresponding to other users that have the same electronic publication stored in their library 210. When that page is displayed to another user, event detection modules 202, 402 may identify the virtual meeting of the character as an event. The user may override this configuration and not detect an event based on another user's event creation. In some embodiments, before a newly created event is propagated to other event detection modules 202, 402, it may be verified by system 100 or other reviewers.

In some embodiments, system 100 may process an electronic publication to create event markers or advertisement markers so that when a specific page of the e-book is displayed, event detection modules 202, 402 will detect the occurrence of an event or display an advertisement. For example, system 100 may search for key words, such as a location, and flag the first occurrence of a location as an event. For example, the first time encountering a new location in the electronic publication may be flagged as an event. System 100 may also display an advertisement or offer associated with the location, such as for example a discount on air fare. System 100 may also detect an event when an act occurs within a plot of an electronic publication, such as the death of a character. System 100 may process some or all of the electronic publication in digital warehouse to create event markers or advertisement markers before a copy of the electronic publication is available to users via store 410.

Figure 3:
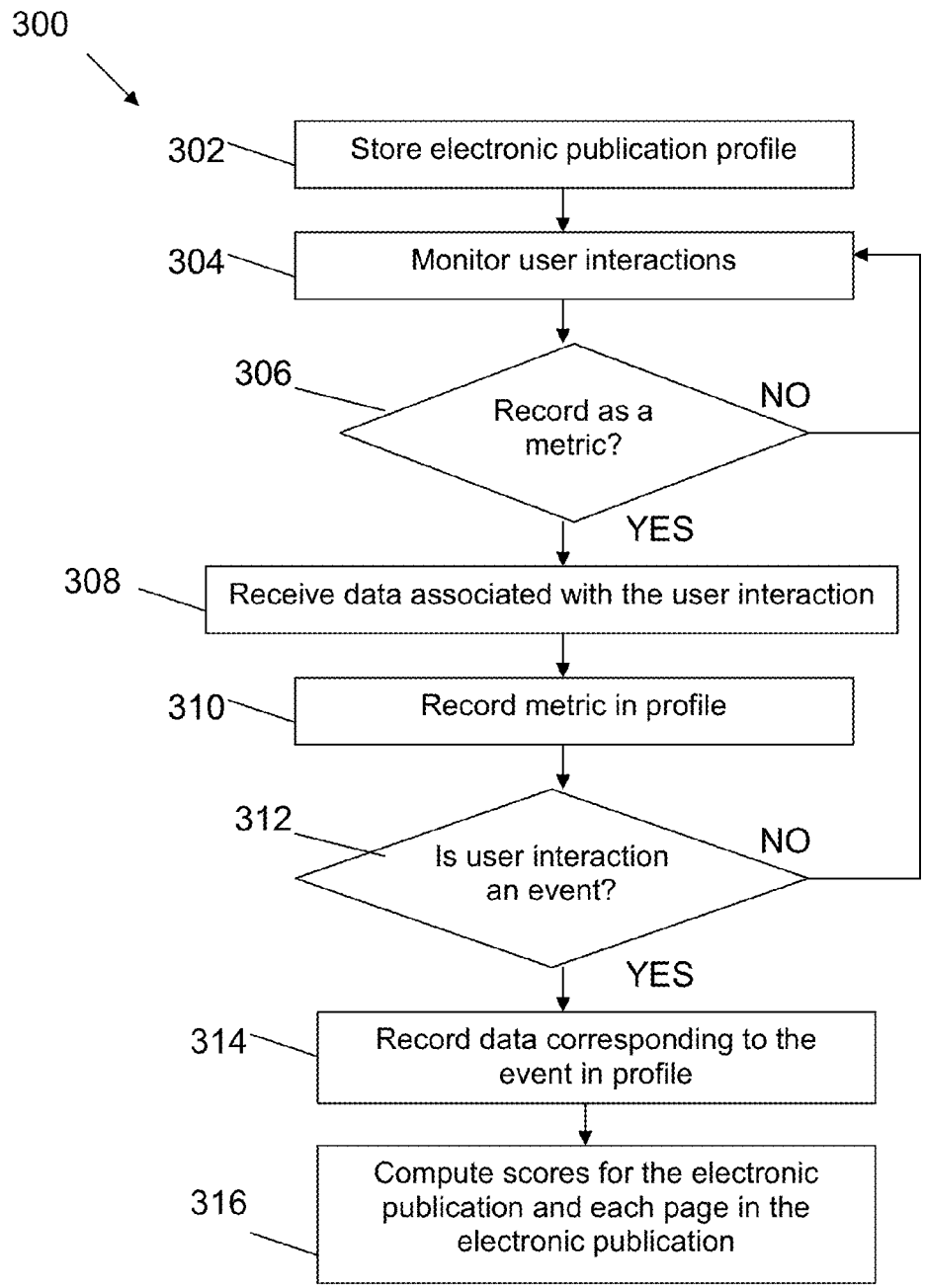
FIG. 3 is a flowchart of a method for managing profiles of electronic publications in accordance with at least one embodiment.

Reference is now made to FIG. 3, which illustrates a method 300 for managing profiles for electronic publications in accordance with at least one embodiment. The method 300 for managing profiles for electronic publications enables system 100 to collect data about user interactions with the electronic publication, record the collected data in a profile and process the collected information to compute a score for the whole electronic publication and pages thereof, and other statistical data and results about the electronic publication. System 100 may be operable to create a social network based on the profiles of the electronic publications.

At step 302, system 100 stores profiles for electronic publications 108, 110, 114, 116. A profile provides a data structure for recording collected data about the electronic publication. The profile may include an electronic publication identifier identifying the electronic publication associated with the profile in order to provide a link between the profile and the electronic publication. System 100 may receive the electronic publication identifier from server 104 or via a device 102a, 102b, 102c. System 100 may store the profiles in the client electronic publication profile 204, server electronic publication profile 404, or both. The electronic publication profile includes the electronic publication identifier to enable the system 100 to identify and retrieve the electronic publication profile associated with a particular electronic publication in order to record metrics, events, notifications, scores, and other data associated with electronic publication and pages thereof. The electronic publication profile is used to render data to provide a visual display of an electronic publication profile for display to user and provision to other applications.

At step 304, system 100 monitors for input data associated with user interactions with an electronic publication in order to identify metrics and events, and collect data about the electronic publication to compute a score for the electronic publication and pages thereof. System 100 may monitor user interactions that are received as input data when a user interacts with an electronic publication using the reading module 212, library 210, the device 102a, 102b, 102c, social network application, or a third-party network application 120, such as Facebook™ and Twitter™. User interactions may also occur on the server 104 such as a user searching electronic publications in digital warehouse 412 or purchasing electronic publications from store 410. Multiple users may also interact with the same electronic publication and data corresponding to the user interactions with the electronic publication by the multiple users may be recorded in the profile. All user interactions may be associated with that particular electronic publication regardless of whether they carried out by different users, or occur on the device 102a, 102b, 102c, server 104, social network application, or a third-party network application 120. System 100 may receive input data via a keyboard, touch screen, buttons, voice commands, and so on. System 100 may maintain an activity log of all user interactions by recording metrics associated with user interactions, even if not identified as an event. As noted herein, user interactions may be received from the device 102a or the server 104, such as by scrolling through pages or purchasing an e-book from the store 410. If a user interaction is detected on a device 102a, 102b, 102c then a notice of the user interaction may be transmitted to the server 104.

At step 306, system 100 determines whether the user interaction with the electronic publication qualifies as a metric. System 100 uses server event detection module 402 and client event detection module 202 to determine whether the user activity associated with either the server 104 and devices 102a, 102b, 102c, social network application or third-party network application 120, should be identified as a metric and recorded in the profile of the electronic publication. An example of a metric is turning a page in a particular electronic publication. Event detection module 202, 402 may interact with event definition module 401 to identify a user interaction as a metric using metric definitions maintained and stored thereby. A metric is a subset of user interactions, as not all user interactions will be recorded by system 100 as a metric in the profile of the electronic publication. Metrics may be based on one or more of the following dimensions: activity based (e.g. adding the electronic publication to a user's library 210); time based (e.g. reading the electronic publication between midnight and 3 am); content based (e.g. finished the last page of the electronic publication); and location based (e.g. reading the electronic publication on a beach in Mexico, virtually arriving at a location in the electronic publication). A metric may be based on user interactions with the electronic publication, interactions with other users (conversations, chat sessions), and activities on social network applications 120 in relation to the electronic publication. For example, metrics will record when a user shares data about electronic publication with other users, what the data is, and who the other users are, to record a form of social graph for the electronic publication.

When event detection modules 202, 402 identify a user interaction as a metric, then at step 308, system 100 receives data associated with the metric and, at step 310, records the received data as a metric in the profile of the electronic publication. If a user interaction is specific to a page of the electronic publication then the data received and recorded by system 100 includes a pagestamp indicating the page in the electronic publication. The pagestamp provides a link between the page in the electronic publication and the data recorded in the profile. If the user interaction does not qualify as a metric, the method 300 returns to step 304 and system continues to monitor user interactions with the electronic publication to identify metrics and events.

At step 312, system 100 determines whether the user interaction or metric qualifies as an event. For example, an event may be a comment on a page of the electronic publication, an annotation on a page of the electronic publication, an endnote or review of the electronic publication, a like/dislike of a page of the electronic publication, a share of a page, and so on. System 100 uses server event detection module 402 and client event detection module 202 to determine whether the user interaction associated with the electronic publication should be identified as an event and recorded in the profile of the electronic publication. Not all metrics (which are in turn a subset of user interactions) may be identified as events. Events may be a subset of metrics. For example, a metric may be turning 1 page in the electronic publication, and an event may be turning all pages of the electronic publication. System 100 will identify and record each individual page turn as metrics to in turn identify the event, turning the last page in the electronic publication. Event detection module 202, 402 may interact with event definition module 401 to identify the occurrence of an event using event definitions maintained and stored thereby. As noted herein, event definition module 401 contains event definitions that are rules or patterns used to identify specific user interactions with the electronic publication and recorded metrics as events. The server event detection module 402 and client event detection module 202 compare input data associated with a metric and user interaction to the rules or patterns of event definitions to identify events. For example, an event may be reading 100 pages of electronic publication in less than 1 hour, and may be defined by an event definition so that this user interaction is captured by system 100. Accordingly, an event may be identified based on one or a combination of multiple user interactions or metrics. For example, one metric may be turning 1 page and an event may be turning 100 pages in under one hour, so that an event is identified when 100 individual metrics of turning 1 page are detected within a time period that is less than one hour. System 100 is operable to record a timestamp as part of each recorded metric in order to compute the time period in the event definition.

Exemplary events performed by a user on the device 102a may include, for example, purchasing electronic publication, commenting on a page, annotating a page, bookmarking a page, like/dislike of a page, completing a chapter, completing an electronic publication, completing a series/collection of electronic publications and completing a predetermined number of pages and chapters in the electronic publication. In addition, events may include posting a message to social network application about the electronic publication or a third-party network application 120, or other digital interaction. Events with contextual information include for example a user turning a pre-defined number of pages in a specific publication, such as Pride and Prejudice by Jane Austen. Events may be based on one or more of the following dimensions: activity based (e.g. adding a new electronic publication to their library 210); time based (e.g. reading the electronic publication between midnight and 3 am); content based (e.g. completed the electronic publication); and location based (e.g. reading the electronic publication on a beach in Mexico). An event may be based on user interactions with an electronic publication, interactions with other users about electronic publication (conversations, chat sessions), and activities about the electronic publication on social network application or on third-party network applications 120. For example, events will record when a user shares data about electronic publication with other users, what the data is, and who the other users are, to record a form of social graph for the profile of the electronic publication.

Events definitions and metric definitions may be generated by automatically searching content from electronic publication regarding characters in the electronic publication and locations in the electronic publication. Events definitions and metric definitions may also be generated based on programmed algorithms and a semantic analysis. A user interaction would be the user's interaction with these generated content based events relating to the electronic publication, via a dialogue box for example. In response to such user interaction, event detection modules 202, 402 may identify an event. For example, the first time a particular character is described or referred to in a page in the electronic publication viewed by the user, event detection modules 202, 402 may display an indication that the user is meeting this character from the electronic publication for the first time and identify this virtual meeting as an event. The mechanism used to obtain data for the content-based events include: manual selection, keyword searching, crowd sourcing, and import of third party datasets. For example, when a new character is introduced on a page of the electronic publication, event detection module 202, 402, may detect the occurrence of an event in response to receiving a request to create an event from the user, by e.g. highlighting and clicking on the name of the character. System 100 may record the occurrence of a new event and propagate this detection to all other event detection modules 202, 402, corresponding to other users that have the same electronic publication stored in their library 210. When that page is displayed to another user, event detection modules 202, 402 may identify the virtual meeting of the character as an event. The user may override this configuration and not detect an event based on another user's event creation. In some embodiments, before a user created event is propagated to other event detection modules 202, 402 it may be verified by system 100 or other reviewers.

In some embodiments, an electronic publication may be configured with event markers so that when a specific page of the electronic publication is displayed, event detection modules 202, 402 will detect the occurrence of an event, based on key words, such as a location for example, and flag the first occurrence of a location as an event, namely, the first time the user virtually encounters a new location described in the story of the electronic publication. An event may also be a user interaction associated with an act that occurs within the story of the electronic publication, such as the death of a character. The user interaction may be a dislike of that page to indicate that the user does not like that this character died. Some or all of the electronic publications in digital warehouse may be configured with event markers before a-copy of the electronic publication is available via store 410.

When event detection modules 202, 402 detects the occurrence of an event, event data is provided to analytics engine 403 for computing statistical data and pattern matching to rules maintained in a rules engine. If the user interaction does not qualify as an event, the method 300 returns to step 304 and system continues to monitor user interactions with the electronic publication to identify metrics and events. If the user activity does warrant the creation of an occurrence of the event the method 300 proceeds to step 314.

At step 314 the system 100 collects data corresponding to the event associated with the electronic publication or a page thereof and records data corresponding to the event as a data entry in the profile 404, 204 associated with the electronic publication. If a user interaction is specific to a page of the electronic publication then the data received and recorded by system 100 includes a pagestamp indicating the page in the electronic publication. The pagestamp provides a link between the page of the electronic publication and the data corresponding to the event recorded in the profile. System 100 records the event data in the profile 404, 204 associated with the electronic publication so that scores for the electronic publication and pages thereof, and other statistical data may be subsequently computed and shared via social network application, third-party network applications 120, and so on.

At step 316, system 100 via analytics engine 403 computes scores for the electronic publication and for each page in the electronic publication using data corresponding to events recorded in the profile of the electronic publication. Analytics engine 403 is operable to compile, correlate, and aggregate data entries corresponding to one or more events or metrics based on the pagestamps in order to compute scores. The score provides an indication of a level of user interest in the electronic publication or a page of the electronic publication. The score may be used to rank or recommend electronic publications and pages thereof.

Analytics engine 403 is operable to compute data points for the electronic publication and for each page in the electronic publication that aggregate those data points in order to compute the scores. For example, data points may include a number of purchases of the electronic publication, a number of completions of the electronic publication, a number of times users read the electronic publication or the page, and average time to read the electronic publication or the page, and annotation rate for the electronic publication or the page, highlight rate for the electronic publication or the page, the comment rate for electronic publication or the page, the comment rate compared to the annotation rate, the bookmark rate for the electronic publication or the page, the like/dislike ratio for the electronic publication or the page, like/dislike ratio to comment ratio, random noise range, and the number of users reading the electronic publication or page. The data points may represent numerical values that are aggregated (e.g. based on pagestamp for a score for a particular page). Each of these data points may be associated with the weight factor to represent that some data points may have more influence on the total score for the electronic publication or each page in the electronic publication. Other data points may have less influence on the total score. The data points may be multiplied by their weight factor before being aggregated to compute the score. The data points may also be normalized before being aggregated to ensure that the final score is within a specific range such as 0 to 100.

Each data point may be calculated by aggregating sub data points. For example a data point may be a number of purchases of electronic publication which may be calculated based on a number of sub data points such as total purchases, daily purchases, and purchases in the last seven days. Another data point may be a number of completions of electronic publication which may be calculated based on sub data points such as total completions, daily completions, completions in the last seven days. A further data point may be a number of readers which may be calculated based on number of sub data points such as total readers, daily readers (with unique user identifiers), and readers or bookmarks the last seven days. A data point may be the number of comments which may be calculated based on the total number of comments for the electronic publication or a page in the electronic publication (by different users, for example), daily comments, and the number of comments in the last seven days. A data point may be the number of likes/dislikes which may be calculated based on the total number of likes/dislikes of the electronic publication or page in the electronic publication (by different users, for example), daily like/dislikes, and the number of likes/dislikes in the last seven days. A data point may be the number of highlights of text which may be calculated based on the total number of highlights in the electronic publication or page in the electronic publication (by different users, for example), daily highlights, and the number of highlights in the last seven days. A data point may be the number of bookmarks which may be calculated based on the total number of bookmarks made in the electronic publication or page in the electronic publication (by different users, for example), daily bookmarks, and the number of bookmarks in the last seven days. A data point may be the number of annotations which may be calculated based on the total number of annotations in the electronic publication or page in the electronic publication (by different users, for example), daily annotations, and the number of annotations in the last seven days.

Analytics engine 403 is operable to generate a graph of the scores associated with the electronic publication, where, for example, one axis represents the range of possible scores and the other axis represents the pages of the electronic publication, so that the graph displays the score associated with each page of electronic publication. The graph may be rendered to generate a visual display of the scores for the entire electronic publication. Analytics engine 403 is also operable to generate a visual indicator representing the calculated score associated with each page and the visual indicator may be rendered to provide a visual display of the score for a particular page in the electronic publication win that particular page is displayed to a user. Analytics engine 403 is further operable to generate an activity feed for a page or the whole electronic publication, where the activity feed is a listing of user interactions associated with the page, proximate pages, or the whole electronic publication.

Server 104 may be operable to analyze data associated with metrics, events, and scores to determine whether an advertisement, offer or recommendation should be provided to a user in association with the electronic publication. The server 104 may process data associated with metrics, scores, and events associated with the electronic publication to determine an advertisement, offer or recommendation. The server 104 may provide an advertisement, offer, or recommendation that is associated with the type electronic publication, when the electronic publication is read, where the electronic publication is read, and so on. For example, if a user is reading the electronic publication late at night an advertisement, offer or recommendation for an energy drink may be displayed to the user. An advertisement, offer or recommendation may be provided in a variety of media such as text, image, audio video or a combination thereof. Server 104 may analyze data associated with metrics, scores and events to determine the particular medium in which the advertisement should be provided. For example, if collected metrics indicate that the electronic publication includes a video then an advertisement, offer or recommendation may be provided as a video. In accordance with an example embodiment, analytics engine 403 is configured with rules to analyze profiles of electronic publications in library 210 to make recommendations for electronic publications, based on genre, type, and profiles 404 of other electronic publications.

In a further embodiment, a notification in relation to the electronic publication may be transmitted to a social network application or third-party network application 120. For example, social connector module 405, 205 communicates the notification about the electronic publication as indicated under a social network user name, social network formatted text, or a combination thereof. For example, the server 104 may provide a notification about the electronic publication by displaying it in a rendering of the profile.

System 100 is operable to provide a visual display of all electronic publications in a library. System 100 is operable to display the electronic publications as a series of icons and to further display the computed score associated with each electronic publication to assist in selecting an electronic publication. In response to a user clicking on an icon representing electronic publication, system 100 is operable to display further details about the computed score associated with the electronic publication, such as the main contributing factors for the score and an activity thread indicating user interactions with the electronic publication.

Reference is now made to FIG. 4, which illustrates rendered data to provide a visual display 500 of data from exemplary embodiments of electronic publication profiles 404, 204. In this illustrative example visual display 500 displays three types of visual indicators of user interactions with the page of electronic publication. The visual display 500 includes a page of the electronic publication, a visual indicator 502 representing the calculated score for the page of the electronic publication, a visual representation 504 of a mechanism for collecting comments about the page from users, and a visual representation 506 of a mechanism for collecting data defining whether of user likes or dislikes the page. The visual display 500 may also include mechanisms for user to annotate, highlight, and bookmark the page or portion thereof. The visual display 500 of data from the profile may be displayed in response to a user activating a social overlay associated with the page and the electronic publication.

For this example, the visual indicator 502 representing the calculated score for the page of the electronic publication is a semicircle that increases in radius as the score for a page increases. For example, if a page has a lower score it may have a smaller semicircle and if a page has a larger score it may have a larger semicircle. This is merely an illustrative example and other forms and types of visual indicators may be used to represent the score. The visual indicator 502 representing the calculated score provides a visual indication of the level of user interest in the page of electronic publication. When the page of the electronic publication is displayed to a user then system 100 is operable to display the visual indicator 502 with the page.

An example user interaction with a page of an electronic publication is an indication whether a user likes or dislikes the page. When a page is displayed to a user then system is operable to display a visual representation 506 of a mechanism for collecting data defining whether of user likes or dislikes the page. This mechanism provides a simple and easy way for users to express a feeling (like or dislike) about the page as well as see what other users are feeling about the page. For example a user may activate visual representation 506 and indicate whether he/she likes or dislikes the page. System 100 is operable to collect data corresponding to the like or dislike, detect that the event has occurred, and record data corresponding to the like or dislike in the profile of the electronic publication, where the data includes a pagestamp corresponding to the page. When the page is subsequently displayed to the user or another user, system is operable to show a visual representation of all likes or dislikes of the page. System 100 is further operable to compute like or dislike ratio or score for the page by aggregating all of the likes or dislikes for the page. System 100 is operable to display an icon relating to the overall like or dislike ratio or score such as by displaying a happy face, a neutral face or sad face on the page, and by further indicating the number of people that have liked the page and disliked the page.

An example user interaction with the page of electronic publication is a comment on the page. When a page is displayed to user and system is operable to display a visual representation 504 of a mechanism for collecting comments about the page from users. For example a user may activate the visual representation 504 and a dialog box may appear requesting that the user enter text corresponding to their comment. System 100 is operable to collect the entered text, detect that an event has occurred, and record data corresponding to the comment in the profile of the electronic publication, where the data includes a pagestamp corresponding to the page. System 100 is operable to display all comments associated with a page when the page is displayed to a user. The mechanism may provide an access point to community discussion threads that have been created for a page. A user can quickly tap the mechanism to add to, review or interact with the discussion thread. System 100 is further operable to compute a comment score for the page based on the number of comments on the page. The comment score provides an indication of the level of interest in the page based on the number of comments on the page. System 100 is operable to display a visual representation of the comment score such as by displaying an icon indicating the number of comments on the page. When a user activates the icon all comments on the page may be displayed to the user.

The visual display 500 may also include indications to show when a user and other users have created annotations on the page, bookmarks or highlights. In some embodiments, a user may select the permissions for certain user interactions by setting a privacy status to private to prevent the public display of the interaction. The visual display 500 may also provide mechanisms to share user interactions via a social network application or third-party social networks. For example, the user may want to share a comment or annotation on the page. The visual display 500 may provide a mechanism to indicate when a user interaction has been shared.

Referring now to FIG. 5, which illustrates rendered data to provide an alternative view of the visual display 500 of data from exemplary embodiments of electronic publication profiles 404, 204. The alternative view of visual display 500 illustrates an overlay 510 displaying a feed of comments and user interactions associated with the page of the electronic publication. System is operable to generate the overlay 510 and feed by querying for data in the profiles 404, 204 linked to the page stamp indicating the page. The overlay 510 includes a mechanism for collecting comments from the user about the page for inclusion in the profile of the electronic publication and link to the page via a pagestamp.

Figure 6:
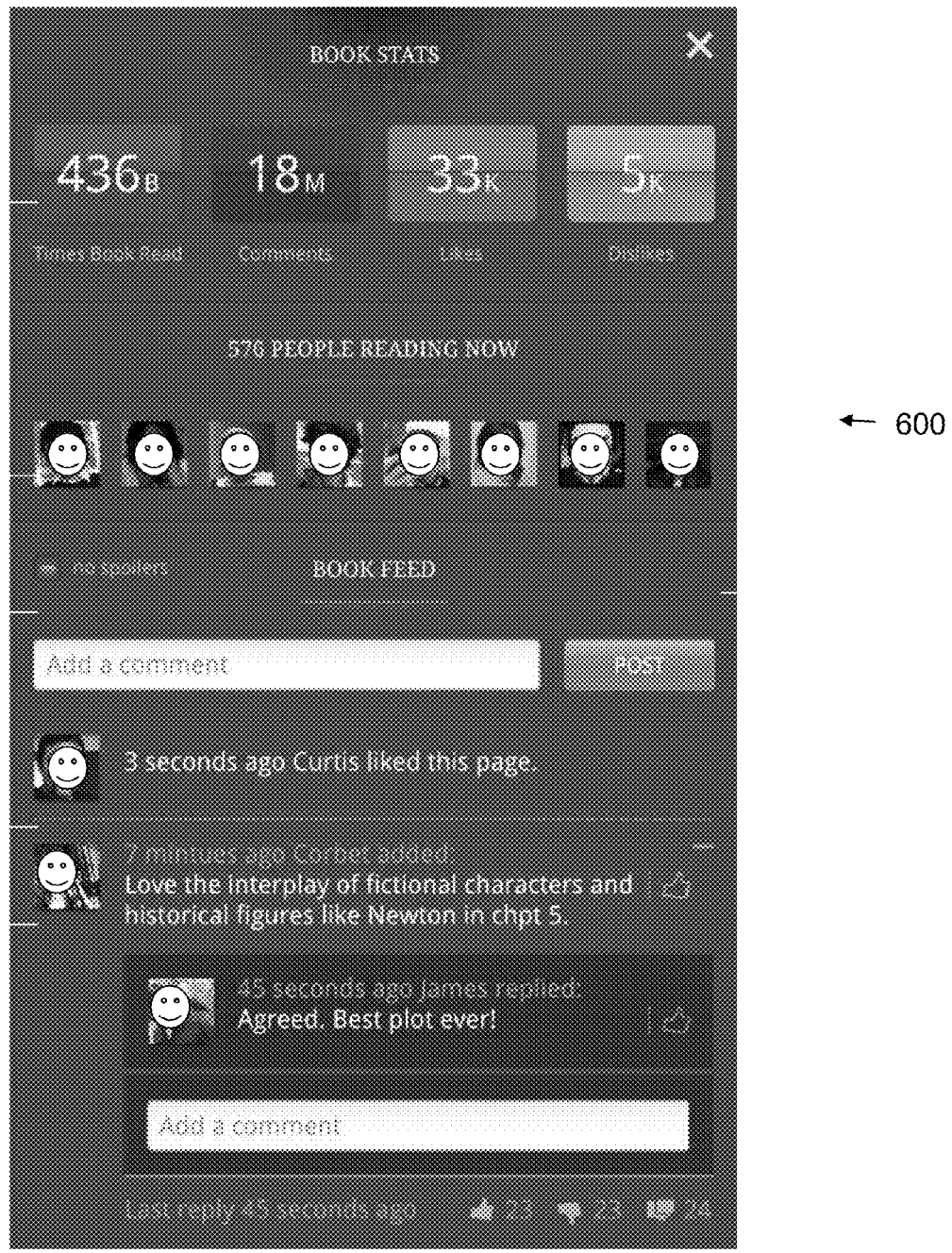
FIG. 6 is a further screen display of a rendered data to provide a visual display of data from a profile of electronic publications in accordance with at least one embodiment.

Referring now to FIG. 6, which illustrates rendered data to provide a visual display 600 of data from exemplary embodiments of electronic publication profiles 404, 204. The visual display 600 includes statistical data corresponding to the e-book as a whole. For example, the visual display may include the score for the e-book as a whole and may show the value of each major contributing component used to compute the score. The statistical data may include the number of times the electronic publication has been read, the number of comments made at any page of the electronic publication or on the electronic publication as a whole, the number of likes associated with any page of the electronic publication or with electronic publication as a whole, the number of dislikes associated with any page of the electronic publication or with electronic publication as a whole. The visual display 600 also provides a visual representation of users currently reading electronic publication and also provides a visual representation of a forum for users to comment on the electronic publication and to review other users' comments. System 100 is operable to generate the visual display 600 using data stored in the profile of the electronic publication. The visual display 600 may also include a visual indication of the score associated with the electronic publication and may also include a visual indication of the score associated with each page of the electronic publication, such as by displaying a graph. Analytics engine 403 computes statistical data using rules and received event data in profiles 404, 204. The visual display 600 may provide an activity feed for the e-book, and may provide an aggregate of all user interactions identified as events or otherwise associated with the electronic publication, and may include on aggregate comment virtual wall involving all the comments from pages of the electronic publication. The system 100 may provide a filter mechanism to filter out specific user interactions that may be deemed as a "spoiler" for the e-book by analyzing the contents of the user interactions. This may prevent a user that has not completed the electronic publication from learning of specific details of later parts in the electronic publication. The system 100 enables a user to interact with other user interactions such as commenting on or replying to another user's comment or liking a comment, for example.

Example embodiments have been described herein in relation to electronic publications. However, the described embodiments may also be used for other types of electronic content, such as movies, television shows, music albums or songs. In accordance with other example embodiments, the metrics, events, and scores may relate to different types of electronic content. For example, a metric or event may relate to listening to a song or album, liking or disliking a portion of a song, commenting on a portion of a movie, and so on.

The system 100 and method 300 described herein may provide an advantage of enhancing the digital reading experience by making what was previously a predominantly solitary activity interactive, fun, social and meaningful. By managing profiles of electronic publications and analyzing metrics, events associated with the electronic publication to compute scores associated with the electronic publication, the culture of reading may enhance the digital experience of reading electronic publications. For example, the system 100 and method 300 may provide a connection between the users reading the same electronic publication, and provide a mechanism through the score to indicate a level of user interest in a particular page of the electronic publication. The system 100 and method 300 may permit the user to discover and share favorite electronic publications and passages within electronic publications, characters of electronic publications and places within electronic publications with other users and friends via the profiles of the electronic publications, social network application and third-party network applications 120. The system 100 and method 300 may compute and record statistical data, scores, and a timeline of events.

The system 100 and method 300 described herein may increase engagement by the user with electronic publication and increase the frequency of reading electronic publications. The profile provides a mechanism to record real-time metrics based on user interactions with electronic publication. The profile may also record contextual information for events associated with electronic publication, such as a user's current location when the event occurs. Recorded locations may be identified on a map and displayed to the user as part of a rendering of data in the profile to create a visual display for the user.

The system 100 and method 300 described herein may provide an interactive software application to collect metrics from the user, a listing of all electronic publications in the user's library, a software application that computes and displays a list of friends of the user that are currently reading an electronic publications, what electronic publication they are currently reading, and where they are currently reading the electronic publication. The system 100 and method 300 described herein may provide recommendations and filters based on recorded metrics to provide recommendations and other computer statistics to the user, such as for example a list of electronic publications that other users are reading who are within the same geographic area as the user. The system 100 and method 300 described herein may enable a user to communicate particular metrics and events to particular users, or all users of the system 100. For example, events for a particular user may be displayed as a stream of data associate with electronic publication and system 100 may be configured to display a portion of events all events. As a further example, system 100 may enable one user to send a message to another user of system 100 using social network application or third-party network application 120.

The system 100 and method 300 described herein may provide a community of users, connected as a network of nodes in the social network application, and further connected to third-party network applications 120. For example, the system 100 and method 300 is operable to manage a network of users and electronic publications. The system 100 and method 300 is operable to store user profiles for users, each being a user of at least one device configured to access at least one electronic publication for each user in a memory, wherein each user profile comprises a user identifier identifying the user. The system 100 and method 300 is operable to store profiles for electronic publications. The system 100 and method 300 is operable to collect data corresponding to events associated with the page of the electronic publication, wherein the data comprises a pagestamp and a user identifier, wherein the pagestamp indicates the page in the electronic publication, and wherein the user identifier indicates the user. The system 100 and method 300 is operable to record at least a portion of the data corresponding to the event as a data entry in the profile electronic publication and/or user, wherein the data entry comprises the pagestamp and the user identifier.

The system 100 and method 300 may provide a community to enable users to communicate and share electronic publications, trends, content of electronic publications (quotes), and events with other users. The system 100 and method 300 is operable to aggregate these user interactions to compute a score for the pages of electronic publication to provide a visual indication of the level of user interest in a particular page or electronic publication. The system 100 and method 300 may filter shared data by geographic location, such that a user can see what electronic publications other users in, for example, the same city are also reading.

The system 100 and method 300 may configure electronic publications with virtual markers to assist system 100 and method 300 in identifying events, such as when a user will first encounter a character described in an electronic publication and when user comments on a page for example. These virtual markers may be created by multiple users of the system 100 or may automatically be created by keyword searching and the like. The virtual markers may also be associated with an advertisement so that when system 100 displays a page of an electronic publication annotated with a virtual marker an associated advertisement or sponsored offer is displayed. As noted herein, the system 100 and method 300 records data associated with metrics and events in profiles and may display recorded data for the user as part of a rendering of the electronic publication or pages thereof. The data associated with metrics and events may include timestamps for when the metrics and events occur, and the data associated with the metrics and events may be displayed to a user as a time line. Further example metrics include, where users are reading the electronic publication, when users are reading the electronic publication, what users are reading the electronic publication, time taken to read the electronic publication.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of managing profiles for electronic publications comprising:
   identifying a user interaction with a page of an electronic publication as an event when the user interaction meets an event definition, wherein the event is associated with the page of the electronic publication, wherein the identifying step is carried out using a processor;
   collecting event data corresponding to the event associated with the page of the electronic publication, wherein the event data comprises a pagestamp, wherein the pagestamp corresponds to the page of the electronic publication;
   recording the event data as a new data entry in a profile corresponding to the electronic publication, wherein the profile of the electronic publication comprises a plurality of data entries, wherein at least two data entries of the plurality of data entries are associated with different respective events;
   computing a score for each page of the electronic publication by correlating the plurality of data entries in the profile of the electronic publication based on the pagestamp of each data entry; and
   displaying a visual indicator representing the score associated with a displayed page of the electronic publication.

2. The method of claim 1, further comprising displaying an overlay window comprising at least a portion of the plurality of data entries recorded in the profile for the electronic publication, wherein the portion of the plurality of data entries is selected based on the pagestamp of each data entry of the portion of the plurality of data entries.

3. The method of claim 1, wherein the plurality of event definitions comprise one or more members of the group consisting of: turning to the page, turning the page, commenting on the page, highlighting a portion of the page, annotating at least a portion of the page, sharing at least a portion of the page, bookmarking the page, indicating a like or dislike of a comment, replying to a comment, indicating a like or dislike to a reply to a comment, adding the electronic publication to an electronic library, finishing the page of the electronic publication, finishing the electronic publication, reading the electronic publication in a location, reading about a location on the page, and reading about a character on the page.

4. The method of claim 1, wherein computing the score for the page comprises computing a plurality of data points for the page and aggregating the plurality of data points, wherein each data point of the plurality of data points is a numerical value representing at least a frequency of each event associated with the page of the electronic publication and each data point is generated from correlating the plurality of data entries.

5. The method of claim 4, wherein each data point of the plurality of data points is associated with a weight factor and wherein computing the score comprises weighting each data point using the corresponding weight factor.

6. The method of claim 4, wherein the data points comprise one or more members of the group consisting of: number of purchases of the electronic publication, a number of completions of the electronic publication, a number of times users read the electronic publication or the page, average time to read the electronic publication or the page, average time left to complete the electronic publication or the page, reading rate, share rate, annotation rate, highlight rate, comment rate, comment rate compared to annotation rate, bookmark rate, like or dislike ratio; like or dislike to comment ratio, random noise range, number of users of the electronic publication and page thereof.

7. The method of claim 2, wherein the portion of the data entries of the overlay comprise one or more members of the group consisting of; number of purchases of the electronic publication, a number of completions of the electronic publication, a number of times users read the electronic publication or the page, average time to read the electronic publication or the page, average time left to complete the electronic publication or the page, reading rate, share rate, annotation rate, highlight rate, comment rate, comment rate compared to annotation rate, bookmark rate, like or dislike ratio; like or dislike to comment ratio, random noise range, number of users of the electronic publication and page thereof.

8. The method of claim 1, further comprising computing a score for the electronic publication using the data entries recorded in the profile of the electronic publication, wherein the score for the electronic publication provides an indication of a level of user interest in the electronic publication.

9. The method of claim 1, further comprising providing a mechanism for collecting the event data, wherein the step of collecting the event data involves using the mechanism.

10. The method of claim 2, further comprising providing a mechanism for triggering the display of the overlay, wherein the step of displaying the overlay involves using the mechanism.

11. The method of claim 2, further comprising:
collecting statistical data about a plurality of user interactions with the page of the electronic publication;
calculating the score associated with the page within the electronic publication using the statistical data, wherein the score represents a level of user interest in the page of the electronic publication; and wherein the overlay comprises at least a portion of the statistical data.

12. The method of claim 1, wherein collecting event data further comprises receiving a time period associated with the event.

13. The method of claim 1, wherein collecting event data further comprises receiving content from the at least one electronic publication.

14. The method of claim 1, wherein collecting event data further comprises receiving a location of at least one device configured to access the electronic publication.

15. A system of managing profiles for electronic publications comprising:
an event detection module configured to:
identify a user interaction with a page of an electronic publication as an event when the user interaction meets an event definition, wherein the event is associated with the page of the electronic publication, wherein the identifying step is carried out using a processor;
collect event data corresponding to the event associated with the page of the electronic publication, wherein the event data comprises a pagestamp, wherein the pagestamp corresponds to the page of the electronic publication;
a profile module configured to record the event data as a new data entry in a profile corresponding to the electronic publication, wherein the profile of the electronic publication comprises a plurality of data entries, wherein at least two data entries of the plurality of data entries are associated with different respective events;
an event analytics engine configured to use a processor to compute a score for each page of the electronic publication by correlating the plurality of data entries in the profile of the electronic publication based on the pagestamp of each data entry;
wherein the profile module is further to configured to display a visual indicator representing the score associated with a displayed page of the electronic publication.

16. The system of claim 15, wherein the profile module is further to configured to display an overlay window comprising at least a portion data entries recorded in the profile for the electronic publication, wherein the portion of the plurality of data entries is selected based on the pagestamp of each data entry of the portion of the plurality of data entries.

17. The system of claim 15, wherein the plurality of event definitions comprise one or more members of the group consisting of: turning to the page, turning the page, commenting on the page, highlighting a portion of the page, annotating at least a portion of the page, sharing at least a portion of the page, bookmarking the page, indicating a like or dislike of a comment, replying to a comment, and indicating a like or dislike to a reply to a comment, adding the electronic publication to an electronic library, finishing the page of the electronic publication, finishing the electronic publication reading the electronic publication in a location, reading about a location on the page, and reading about a character on the page.

18. The system of claim 15, wherein the event analytics engine is operable to compute the score for the page by computing a plurality of data points for the page and aggregating the plurality of data points, wherein each data point of the plurality of data points is a numerical value representing at least a frequency of each event associated with the page of the electronic publication and each data point is generated from correlating the plurality of data entries.

19. The system of claim 18, wherein each data point of the plurality of data points is associated with a weight factor and wherein computing the score comprises weighting each data point using the corresponding weight factor and aggregating the weighted data points.

20. The system of claim 18, wherein the data points comprise one or more members of the group consisting of: number of purchases of the electronic publication, a number of completions of the electronic publication, a number of times users read the electronic publication or the page, average time to read the electronic publication or the page, reading rate, share rate, annotation rate, highlight rate, comment rate, comment rate compared to annotation rate, bookmark rate, like or dislike ratio; like or dislike to comment ratio, random noise range, number of users of the electronic publication and page thereof.

21. The system of claim 16, wherein the portion of the plurality of data entries of the overlay comprise one or more members of the group consisting of: number of purchases of the electronic publication, a number of completions of the electronic publication, a number of times users read the electronic publication or the page, average time to read the electronic publication or the page, average time left to complete the electronic publication or the page, reading rate, share rate, annotation rate, highlight rate, comment rate, comment rate compared to annotation rate, bookmark rate, like or dislike ratio; like or dislike to comment ratio, random noise range, number of users of the electronic publication and page thereof.

22. The system of claim 16, wherein the event detection engine is operable to collect statistical data about a plurality of user interactions with the page of the electronic publication; calculate the score associated with the page within the electronic publication using the statistical data, wherein the score represents a level of user interest in the page of the electronic publication; and wherein the overlay comprises at least a portion of the statistical data.

23. The method of claim 1, wherein displaying the visual indicator representing the score associated with the displayed page of the electronic publication comprises:
generate a relative factor from comparing the score associated with the displayed page with at least one other score associated with the electronic publication, wherein the relative factor represents the score relative to the at least one other score; and
generating the visual indicator for representing the score based on the relative factor.

* * * * *